J. KENNEDY.
BOLT ANCHOR.
APPLICATION FILED DEC. 28, 1918.

1,435,927. Patented Nov. 21, 1922.

INVENTOR
Joseph Kennedy
BY
Marshall A. Dearborn
ATTORNEYS

Patented Nov. 21, 1922.

1,435,927

UNITED STATES PATENT OFFICE.

JOSEPH KENNEDY, OF RICHMOND HILL, NEW YORK, ASSIGNOR TO THE ORSBEE CO. INC., OF NEW YORK, N. Y., A CORPORATION OF NEW YORK.

BOLT ANCHOR.

Original application filed August 13, 1914, Serial No. 856,612. Divided and this application filed December 28, 1918. Serial No. 268,585.

*To all whom it may concern:*

Be it known that I, JOSEPH KENNEDY, a citizen of the United States of America, and a resident of Richmond Hill, county of Queens, and State of New York, and formerly a resident of the borough of Manhattan, city, county and State of New York, have invented certain new and useful Improvements in Bolt Anchors, of which the following is a specification, reference being had to the accompanying drawings, forming a part thereof.

This invention relates to an improved bolt anchor for securing a threaded element as a bolt or other fastening device, in an aperture in a wall or other building construction of brick, stone, cementitious material and the like.

My improved anchor in its broadest aspects is designed to utilize the combined advantages and the beneficial effects of a plug or socket member of relatively hard resistant material which is adapted to receive and hold a bolt or other fastening device, and a deformable sleeve of relatively soft material swaged or crowded into the space between the plug and the walls of the anchorage aperture, whereby the plug is gripped and firmly held in the wall or building construction. The great advantage of a sleeve of soft metal lies in the fact of the tenacious hold of the metal upon the roughened surface of the wall and upon the exterior of the plug, and also in the fact that the soft metal readily accommodates itself to all the irregularities of shape.

In my device the deformable sleeve of relatively soft material is preferably separate and independent from the plug and is swaged or crowded preferably by both endwise and lateral pressure into the space between the plug and the walls of the anchorage aperture. The swaging and crowding of the soft metal is accomplished by the use of a suitable tool, a portion of which fits into the bore of the soft metal sleeve, and another portion of which forms an annular shoulder for engaging the end of the soft metal sleeve.

Referring to the drawings.

Like characters of reference designate corresponding parts in both the figures.

A represents a portion of a wall or other building construction of brick for instance, and B is the hole for the anchor.

Figure 1:
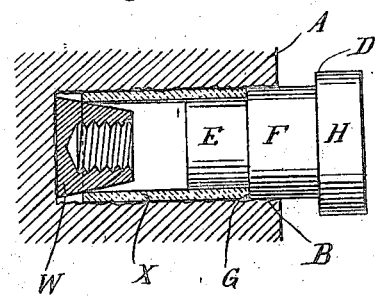
Figure 1 is a longitudinal sectional view, of a hard metal plug and a soft metal sleeve shown within an aperture in a wall and a tool shown in the position in which it is used for swaging and crowding the soft metal sleeve into holding position.

W is an interiorly screw-threaded plug or socket member of hard metal preferably having a tapered extension. This plug is shorter than the length of the hole. It is placed in the aperture against the end thereof. X is a deformable sleeve of relatively soft metal such, for example, as lead or an alloy of lead. After the plug W is inserted in the anchorage aperture the deformable sleeve X is inserted in the position shown in Figure 1. It is then swaged or crowded, by a longitudinal pressure exerted on its end, against the walls of the anchorage aperture preferably by means of a suitable tool D. This tool is provided with a body portion E which is adapted to be inserted in the sleeve X, a neck F of larger diameter being of substantially the same diameter as that of the aperture B. A shoulder G between the portions E and F is adapted to bear against the end of the sleeve X. H is a head which may be struck with a hammer to cause deformation and expansion of the sleeve X throughout its length. The material of the sleeve is expanded and forced into all of the inequalities of the wall of the aperture. During this operation the body portion E prevents the inward expansion of the sleeve.

Figure 2:
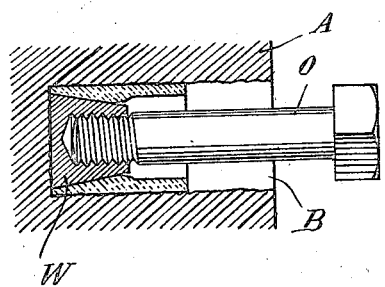
Figure 2 is a similar view showing the soft metal sleeve in its compressed condition and showing a bolt held by the plug.

After this the tool D is withdrawn leaving the parts in the condition in which they are shown in Figure 2 with the plug W securely held in position. After this a bolt O may be passed through the sleeve X into the plug W.

This application is drawn to cover certain matter which was described and claimed in an application filed by applicant August 13, 1914, Serial No. 856,612, which has been held by the officials of the Patent Office to have been abandoned.

I intend no limitations other than those imposed by the appended claims.

What I claim is:

1. The method of forming a threaded anchorage, which consists of inserting an internally threaded member having a tapered outer surface in the bottom of a recess in the body to which the member is to be secured inserting in the recess and over a portion of the tapered member a deformable sleeve having a greater length than that of said member and of relatively soft ductile material, and then driving a part of said sleeve between the member and the wall of the recess and outwardly expanding the remainder of said sleeve by holding the part of said sleeve which extends beyond said member against inward lateral movement, and applying inward longitudinal pressure to the outer end of this sleeve whereby said sleeve is brought into tight engagement with said body and a clearance hole to the threaded member is provided.

2. The method of forming a threaded anchorage, which consists of inserting an internally threaded member of comparatively hard metal, closed at one end, and having a tapered outer surface in the bottom of a recess in the body to which the member is to be secured, inserting in the recess and over a portion of the tapered member a deformable sleeve having a greater length than that of said member and of relatively soft ductile material, and then driving a part of said sleeve between the member and the wall of the recess and outwardly expanding the remainder of said sleeve by holding the part of said sleeve which extends beyond said member against inward lateral movement, and applying inward longitudinal pressure to the outer end of this sleeve whereby said sleeve is brought into tight engagement with said body and a clearance hole to the threaded member is provided.

3. The method of forming a threaded anchorage, which consists of inserting an internally threaded member of relatively hard metal and having a tapered outer surface in the bottom of a recess in the body to which the member is to be secured, inserting in the recess and over a portion of the tapered member a deformable sleeve having greater length than that of said member and of relatively soft ductile material, then outwardly expanding said sleeve by holding the wall of the bore of that part of said sleeve which extends beyond said member against inward lateral movement by applying inward longitudinal pressure to the outer end of the sleeve, whereby a part of the sleeve is forced between the member and the wall of the recess, the outside of the sleeve is brought into tight engagement with the wall of the recess and a clearance hole to the threaded member is provided.

4. The method of forming a threaded anchorage which consists of inserting an internally threaded member having a tapered outer surface in the bottom of a recess in the body to which the member is to be secured, inserting in the recess and over a portion of the tapered member a deformable sleeve having a greater length than that of said member and of relatively soft ductile material, inserting a tool having a portion which fits the bore of the sleeve and a portion which abuts against the outer end of the sleeve and driving said sleeve by the tool between the member and the wall of the recess and outwardly expanding the part of said sleeve which extends beyond the member to force a part of the sleeve between the member and the wall of the recess, to expand the part of the sleeve which extends beyond the member and thereafter removing the tool.

In witness whereof I have hereunto set my hand this 26th day of December, 1918.

JOSEPH KENNEDY.